United States Patent Office 3,323,389
Patented June 6, 1967

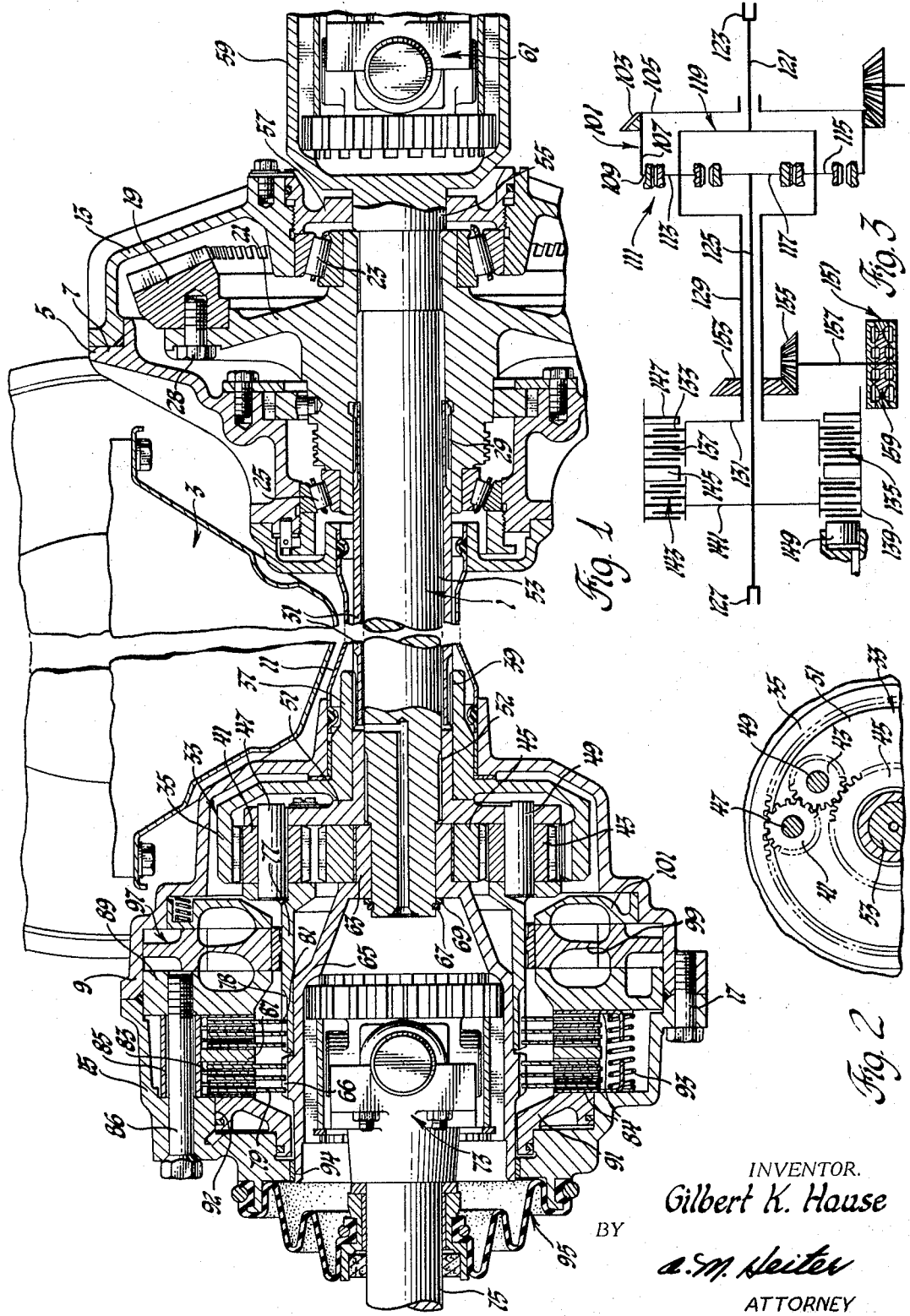

3,323,389
LIVE AXLE
Gilbert K. Hause, Bloomfield Hills, Mich., assignor to General Motors Corporation, Detroit, Mich., a corporation of Delaware
Filed Nov. 30, 1964, Ser. No. 414,660
16 Claims. (Cl. 74—710.5)

This invention relates in general to live axles and more particularly to a new and improved live axle having a final drive, a drive differential and braking structure to control drive differential output.

It has been the practice to provide a drive differential in the live axle of a vehicle to make it possible for a vehicle to turn a corner without drive wheel slippage and yet provide equal torque to the drive axles to propel the vehicle. Such differentials have been generally formed by a nest of bevel gears centrally located in a live axle for driving the axle of each drive wheel. The space requirements for the usual final drive and differential necessitate the separation of live axle from the engine and therefore this axle supports less weight as compared to the dead axle. With this separation and weight distribution snow tires or chains are often used on the vehicle drive wheels to improve traction. With this invention the improved differential and final drive are in a highly compact arrangement making it possible to have the live axle close to or beneath the engine to provide for improved traction without special accessories. In addition to the improved final drive and differential arrangement, this invention also provides for disc-type brakes outboard of the final drive and differential for vehicle braking by braking differential output. A single operator member is preferably used for simultaneously braking both of the differential outputs.

One of the objects of this invention is to provide a new and improved final drive and drive differential forming a drive train.

Another object of this invention is to provide a live axle having a final drive, a differential laterally spaced from the final drive, braking structure to control differential output, a single brake operator member for actuating the braking structure, and pump means for pumping a coolant fluid to the braking structure.

Another object of this invention is to provide a new and improved compact planetary gear drive differential with ring gear input and dual output from the planetary sun gear and pinion carrier.

Another object of this invention is to provide a live axle incorporating a final drive, a planetary drive differential and compact braking structure for simultaneous braking of the differential output for vehicle braking.

Another object of this invention is to provide a live axle including a planetary gear set drive differential with ring gear input, sun gear output to one drive wheel, carrier output to another drive wheel, and compact disc braking inboard of the drive wheel universal joints for controlling the output of the differential planetary gear set.

The objects of this invention can be accomplished by employing a dual-pinion planetary gear set in the live axle of a vehicle. This gear set includes an input ring gear, a first output provided by a sun gear, intermediate dual pinions which intermesh to connect the ring gear and the sun gear, and an output carrier on which the pinions are rotatably mounted. The output sun gear and carrier include enlarged externally-splined hub portions located in close proximity to each other. Splined disc brakes are mounted on the external portion of these hubs. Braking of the output of the differential is accomplished when a longitudinally-movable, hydraulically-actuated piston member moves the brake plates into contact with each other against a fixed backing or reaction plate.

Further objects and advantages of this invention will be apparent from the following description, reference being made to the accompanying drawings wherein a preferred embodiment of the present invention is disclosed.

In the drawings:
FIGURE 1 is a front view partly in section of a front live axle of a vehicle,
FIGURE 2 is a schematic diagram of the planetary gear set of FIGURE 1, and
FIGURE 3 is a diagrammatic view of a second embodiment of the invention.

As shown in FIG. 1, a front live axle 1 of a vehicle generally extends beneath engine 3 and is connected thereto by suitable bolts or other fasteners not shown. This axle includes an elongated axle housing 5 formed by hollow, bell-shaped housings 7 and 9 for the final drive and differential, respectively, interconnected by an elongated tubular sleeve 11. Housings 7 and 9 have cover members 13 and 15 secured thereto by fasteners, such as bolt means 17.

A bevel ring gear 19 located in housing 7 has a hub 21 fixed thereto by bolts 28. This hub is rotatably mounted in the final drive housing 7 by suitable anti-friction bearings 23 and 25. Ring gear 19, forming a part of the final drive, is driven by a cooperating transmission-operated pinion means, not shown. Ring gear hub 21 is connected by splines 29 to one end of a tubular torque transmitting sleeve shaft 31 mounted within the axle housing 5. The drive differential, in its preferred embodiment, is in the form of a double pinion planetary gear set 33 mounted within the differential housing 9.

The planetary gear set includes an input ring gear 35 having a hub portion 37 which is connected by splines 39 to the other end of sleeve shaft 31. The planetary gear set also has first pinions 41 which mesh with the ring gear 35 and second pinions 43 which mesh with the first pinions and the sun gear 45. In its preferred form there is a two-to-one ratio between the ring gear 35 and sun gear 45 and pinions 41 and 43 have the same number of teeth. As best shown in FIG. 2, the pinions are rotatably mounted by pivots 47 and 49 on a carrier 51. This carrier provides a first differential output and is splined at 52 to one end of a rotatable output shaft 53 that extends completely through the sleeve shaft 31. This output shaft is supported at one end by the carrier and at the other end by cylindrical bearing portion 55 which is journalled in bearing 57 secured to cover member 13. Hub 59 formed on the end of the shaft 53 provides an internally splined housing for a universal joint 61 of an axle shaft for the left wheel of the vehicle.

The sun gear 45 is secured to the cylindrical body portion 63 of an output hub 65. Body portion 63 is journalled on the opposite end of the shaft 53 and is retained thereon by clip means 67 and washer 69. As illustrated in the drawing the hub 65 has a splined cylindrical portion 66 and is otherwise similar to the hub 59 of shaft 53 and receives universal joint 73 of axle shaft 75 for the right wheel of the vehicle.

The carrier 51 includes a hub 77 having a splined cylindrical portion 78 which extends onto a portion of and is coaxial with hub 65. The outer periphery of both cylindrical portions 66, 78 of hubs 77 and 65 have the same diameter and are suitably splined to receive mating splines provided on the interior of longitudinally-movable brake discs 79 and 81 which rotate with these hubs. Disposed between these brake discs are longitudinally-movable non-rotatable brake discs 83, splined to support 85, fixed in housing member 9 by bolt means 86. Longitudinally-movable separator 87, also splined to the support 85, divides the discs 79 from the discs 81. A backing plate 89 is also secured in housing member 9 by the threaded bolt 86 for a purpose which will appear below. Braking discs 79, 81, 83 and separator 87 form a brake disc pack which is actuated by a single, pressure-actuated, ring-like piston 91. The piston is mounted for reciprocal movement in cylinder 92 in housing 9. The end of the cylindrical hub 65 may be supported by bearing 94 on housing 9. When fluid pressure is permitted to exert a force behind the piston, the piston will be moved to the right in FIG. 1 to compress the braking discs between the backing plate 89 and the piston 91. Spring 93, seated between the endmost non-rotatable discs 84, is utilized to return the piston to its original position when fluid pressure is relieved. Discs 84 prevent rotation of the piston in the cylinder when the piston is utilized to actuate the brake disc pack. A protective boot assembly 95 closes the end of the differential housing 9 and prevents entry of foreign matter into this housing and into the universal joint 73. A similar boot assembly, not shown, may be provided for the universal joint 61. Since it is desirable to provide means for cooling the high capacity disc brakes, described above, a pump 97 for pumping brake cooling fluid to the disc brakes is utilized. This pump, as shown, may be located in the differential housing 9 and includes an impeller 99 keyed for rotation with the cylindrical portion 77 of carrier 51. This impeller is located between the stationary backing plate 89 and the pump cover member 101. Upon rotation of the carrier 51, impeller 99 will be rotated to circulate cooling fluid to the disc brakes. The construction and operation of such a pump is described in U.S. Patent 3,061,048, issued to D. L. Alsobrooks et al.

It will be appreciated that the road on which the vehicle is travelling acts as a gear train and controls the ratio of wheel speeds. Thus, when the vehicle is moving on a straight path the speed ratio of left and right drive wheels is 1:1. The output sun gear 45 and carrier 51 connected to the right and left drive wheels, respectively, therefore resolve in the same direction and at the same speeds as these wheels. Since there is no relative motion between sun gear and the carrier, and the pinions are not rotating on their pivots, the gear set 33 is effectively locked up providing a direct drive from the final drive to the drive wheels. Torques on output shaft 53 and output hub 65 and the drive wheels are equal.

However, if the vehicle is subsequently turned from a straight path to the right, the roadway still acting as a gear train connecting the drive wheels will change the wheel speed ratio. For example, the wheel speed ratio may change from the 1:1 straight-ahead ratio to a 1.5:1 ratio with the left wheel rotating 1.5 times as fast as the right wheel. When this occurs, the rotational speed of the carrier will be 1.5 times that of the sun gear 45 connected to the right wheel. With this differential motion, pinions 43 revolve clockwise on their pivots 49 and walk around the sun gear while pinions 41 revolve counterclockwise on their pivots. It will be thus understood that the rotational speed given up by the sun gear will be imparted to the output carrier. Due to the fact that the ring gear 35 has, for example, 80 teeth while the sun gear 45 has 40 teeth, the diameter of the ring gear is twice that of the sun gear. With this relationship the torque on the drive shaft 53 and output hub 65 remains equal even during vehicle turns when one drive wheel rotates faster than the other. This will be apparent from the following explanation.

It will be understood that the sum of the output torque on the carrier 51 and the output sun gear 45 is the amount of input torque on input ring gear 35. It will also be understood that the force applied to the ring gear is equal to the force applied to the sun gear and, since the ring gear has a radius or lever arm which is twice that of the sun gear the input torque on the ring gear is twice the torque on the sun gear. Obviously the other half of the input torque is applied to the carrier 51.

If the vehicle is then made to execute a left turn the roadway will again change the wheel speed ratio accordingly, with the right wheel rotating faster than the left wheel. This requires that the output sun gear connected to the right wheel revolves faster than the output carrier attached to the left drive wheel. Pinions 41 will rotate clockwise and meshing pinions 43 will rotate counterclockwise. By this means the speed given up by the carrier will be imparted to the output sun gear. Again, as in the case of straight-ahead drive and right turn described above, there will be equal torque exerted on both drive wheels.

When vehicle braking is desired, piston 91 is moved by fluid pressure as the operator depresses the vehicle brake pedal or operates other suitable brake control means. The piston will be moved to the right in FIGURE 1, compressing the disc brake pack, as described above. When sufficient pressure has been applied to piston 91 through the control, the brake plates will be held from rotation between piston 91 and the backing plate 89. Thus, the carrier 51 and the output sun gear 45 will be braked to slow down and stop the vehicle.

A second embodiment of this invention is illustrated in FIGURE 3. This embodiment is similar in construction and operation to the first embodiment and involves the positioning of the final drive and drive differential units together near one end of the axle and positioning of the braking units and the associated cooling pump near the other end of the axle.

As shown diagrammatically in FIGURE 3, the final drive 101 has a drive pinion with teeth meshing with teeth 103 of bevel ring gear 105. A cylindrical supporting member 107 extends from one side of ring gear 105 and is rigidly connected to the ring gear 109 of the planetary differential unit 111. In addition to ring gear 109 the differential unit includes first pinions 113 which mesh with the ring gear, second pinions 115 which mesh with the first pinions and with sun gear 117. As in the case of the embodiment of FIGS. 1 and 2, there is a 2:1 relationship between the number of teeth on the ring gear and the sun gear. The differential unit 111 also includes the carrier 119 for pinions 113 and 115. As shown, one side of this carrier is rigidly secured to an output shaft 121. This shaft extends in a first direction through gear 105 and carries at its end a hub member 123 which provides a housing for the universal joint of an axle shaft such as that illustrated in FIG. 1. The sun gear 117 has an output shaft 125 which extends in a direction directly opposite of that of output shaft 121 and also has at its end a hub member 127 for the reception of the universal joint of a second axle such as that also illustrated in FIG. 1. The other side of the carrier 119 carries an elongated sleeve 129 which surrounds output shaft 125. This sleeve has an enlarged support hub 131 at the end thereof spaced from carrier 119. Splined for longitudinal movement on the outer periphery of hub 131 are brake or friction discs 133 of a brake unit 135. This unit also includes friction discs 137 splined to the interior of axle housing 139. The output shaft 125 has a fixed support hub 141 positioned beside hub 131. Hub 131 and housing 139 support cooperating friction plates of a second brake or clutch unit 143. Housing 139 has a longitudinally movable separator 145 dividing the two units and a fixed backing plate 147 secured to the housing to provide a reaction member for both brake units, as in the first embodiment. These discs as well as the friction discs of the brake units of the first embodiment may be made in accordance with the disclosure in U.S. Patent 3,061,048 to D. L. Alsobrooks et al.

The brake units can be simultaneously actuated by piston means 149. Cooling of the brake units as in the first embodiment is accomplished by coolant fluid which is circulated to the brake units by periphery pump 151 through suitable fluid-conducting passages, not shown. This pump operates in the manner described in connection with the FIGURE 1 embodiment and the aforementioned U.S. patent. The pump 151 is driven by carrier 119. As shown, the sleeve 129 connected to the carrier supports a bevel gear 153 which meshes with a pinion 155. This pinion is in turn connected to a drive shaft 157 of impeller 159. Impeller rotation occurs on rotation of carrier 119 and meshing gears 153 and 155.

It will be appreciated that upon application of the piston 149 to the brake units, both brake units will be simultaneously activated to control the carrier and sun gear output of the differential as in the embodiment of FIG. 1. In this embodiment, a more compact final drive and differential unit is obtained with both being located at the same end of the axle. The pump may be secured to housing 139 by suitable fastener means such as bolts and protected by a cover plate, not shown. It will also be appreciated that the pump 151 can be easily installed or removed for replacement or repair, due to its location and connection with gear 153.

From the above, it will be understood that applicant has provided a new and improved live axle, having laterally-spaced final drive and differential units, which axle is adapted to be mounted below a vehicle engine to provide a compact power package. Furthermore, the planetary differential permits access to both outputs of the differential so that the splined hubs of the wheel shafts can be side-by-side making a simpler, more compact brake package. It will also be understood that applicant has provided a new and improved unitary brake for controlling the output of the differential.

Although several embodiments of this invention have been shown and described, it will be apparent to those skilled in the art that other embodimentnts and modifications can now readily be made. It will therefore be understood that this invention is not to be confined to that shown or described but only by the limitations of the claims which follow.

I claim:

1. In an axle having a final drive therein, a differential having an input member and first and second output members, torque transmitting means extending from said final drive operatively connecting said final drive and said input member, braking means operatively connected to said differential for braking said differential output members, said braking means being spaced from said differential, a brake actuator member operatively connected to said braking means for actuating said braking means, said differential being disposed between said braking means and said final drive.

2. In a vehicle axle, an elongated housing, a final drive mounted in said housing near one end thereof, braking structure mounted in said housing near the other end thereof, a differential having an input and first and second output members, said braking structure operatively connected to said differential, torque transmitting means operatively connecting said final drive and said differential input, said differential being positioned in said housing between said braking structure and said final drive, longitudinally movable means engageable with said braking structure and cooperating therewith to brake said first and second output members.

3. In a vehicle axle, an elongated housing, a final drive mounted in said housing near one end thereof, a differential spaced from said final drive, said differential having an input member and first and second output members, torque transmitting means connecting said differential input member to said final drive, a first drive member connected to said first output member extending through one end of said housing, a second drive member connected to said second differential output member extending in a direction opposite to the direction of said first drive member, braking means mounted in said housing near one end thereof and operatively connected to said differential for retarding the output of said first and second output members, movable actuator means mounted in said housing at one side of said braking means for selectively engaging said braking means.

4. In combination, a housing having a differential therein, said differential having an input ring gear and an output sun gear and pinions operatively connecting said ring gear with said sun gear, a carrier for said pinions providing a second differential output, said carrier and said sun gear being formed with extensions integral therewith which project in the same direction, braking members mounted on said extensions, cooperating braking members mounted in said housing, and a longitudinally movable piston mounted in said housing for actuating said braking members for braking said differential output.

5. In combination, a housing having a planetary gear set differential therein, said differential having an input gear and an output gear and first pinions meshing with said input gear, second pinions meshing with said output gear and said first pinions, a carrier for said pinions, said carrier providing a second differential output, said output gear and said carrier being formed with extension members, said extension members being provided with braking means, said braking means being positioned next to each other and laterally spaced from said differential, and means selectively engageable with said braking means for braking said carrier and said output gear.

6. In a live axle, a final drive, a differential, and braking means for braking differential output, said differential having a ring gear, a sun gear, first pinions meshing with said ring gear and second pinions meshing with said first pinions and said sun gear, a carrier for said pinions, means connecting said ring gear to said final drive for rotation thereby, an output shaft connected to said carrier, said output shaft extending in a first direction from one side of said differential, an output member connected to said sun gear, said output member extending in a second direction from the other side of said differential, said carrier having an extension extending said second direction, said braking means including braking members mounted on said extension and said output member, and reciprocally movable piston means for selectively moving said braking members.

7. In combination in a live axle, a differential, braking means for braking differential output, a final drive, a housing, said differential and said braking means and said drive being coaxially mounted in said housing, said differential having a ring gear with a predetermined number of teeth, a sun gear having one half the number of teeth of said ring gear, first planet gears meshing with said ring gear and second planet gears meshing with said first planet gears and said sun gear, a carrier for said planet gears, said differential having a first output shaft connected to said carrier and a second output shaft connected to said sun gear, said carrier having an extension projecting in the same direction as said second output shaft, said braking means including braking members slidably and rotatably mounted on said extension and said second output shaft and cooperating braking members slidably mounted in said housing, a piston slidably mounted in said housing for actuating said braking members to brake the output of said differential.

8. In combination in a live axle, a differential, braking means for braking differential output, a final drive, an elongated housing, said differential and said braking means and said final drive being coaxially mounted in said housing, said differential having a ring gear of a predetermined diameter, first planet gears meshing with said ring gear, a sun gear having a diameter one half the diameter of said ring gear, second planet gears meshing with said first planet gears and said sun gear and a carrier for said planet gears, said differential having a first output shaft connected to said carrier extending in a first direction, and a second output shaft connected to said sun gear extending in a second direction, said carrier having an extension projecting in said second direction, said braking means including braking members slidably mounted on said extension and said second output shaft and cooperating braking members slidably mounted in said housing, a non-rotating piston slidably mounted in said axle for actuating said braking members to brake the output of said differential.

9. In an axle, an elongated housing, a final drive mounted in said housing near one end thereof, a planetary differential mounted in said housing near the other end thereof, said differential having an input ring gear with a predetermined diameter, and first and second output members, said second output member having a diameter equal to one half the diameter of said ring gear, brake means mounted in said housing between said differential and one end of said housing for braking said output members, an elongated output shaft connected to said first output member extending through one end of said housing, an output hub member connected to said second output member extending toward the other end of said housing, said first output member having an extension which extends in the same direction as said hub member, said braking means including disc brake members slidably mounted on said hub member and said extension member, a reciprocally mounted piston means mounted in said housing for moving said disc brake members to brake said first and second output members, said hub member and said output shaft providing opposed housings for wheel axle shafts.

10. In a drive train, a final drive including an input gear, a differential including a ring gear and a sun gear, means connecting said input gear to said ring gear, planet gears connecting said ring gear to said sun gear, a carrier for said planet gears, a differential output member extending from said carrier in a first direction, differential output member extending from said sun gear in an opposite direction, first and second juxtapositioned brake units spaced from said final drive input gear for controlling differential output, pump means for pumping cooling fluid to said brake units, and means for simultaneously actuating said braking units to brake said differential output members.

11. The device defined in claim 10 including an elongated support member secured to said carrier, said support member extending in the direction of said second-mentioned output member, said pump having an impeller, gear means connecting said impeller to said support member for rotation thereby, said final drive and said differential being juxtapositioned and spaced from said brake units.

12. The device defined in claim 10 wherein said braking units, said pump and said differential are juxtapositioned and spaced from said final drive and wherein said pump includes an impeller, said impeller being connected directly to said carrier.

13. In a drive train, comprising a final drive including an input gear means, a planetary gear set differential including a ring gear and a sun gear, first planet gears meshing with said ring gear, second planet gears meshing with said sun gears and said first planet gears and a carrier for said first and second planet gears, said differential and said final drive being juxtapositioned, an output shaft extending from said carrier in a first direction, an elongated sleeve extending from said carrier in an opposite direction, a support hub secured to one end of said sleeve, an output shaft connected to said sun gear extending through said sleeve, a support hub secured to said last-mentioned output shaft, said support hubs being juxtapositioned with respect to each other, a first braking unit including a plurality of friction plates splined to said first support hub, a second braking unit including a plurality of plates splined to said second hub, a piston for simultaneously operating said first and second brake units, pump means for circulating a fluid coolant to said brake means, said pump means being located near said brake means, gear means secured to said shaft for driving said pump means.

14. In a drive train, a final drive including an input gear, a planetary gear set differential spaced from said final drive, said planetary gear set having an input member and first and second output members, a connecting member joining said input gear to said input member, a first drive member extending in a first direction from said first output member through said input gear, a second drive member extending from said second output member in a second direction, braking means for braking said first and second output members, said differential being located between said braking means and said final drive, pump means driven by said first output member for circulating a coolant fluid to said braking means, and brake actuator member for actuating said braking means.

15. The drive train of claim 13 in which said first drive member extends through said member connecting said input gear to said input member and in which said pump includes an impeller mounted on said output member for rotation thereby.

16. The drive train of claim 13 wherein said pump includes a rotatable impeller, an elongated rotatable support member connected to said first output member, said support member housing said second drive member, gear means connecting said impeller to said support member, said impeller being rotated by rotation of said support member.

References Cited

UNITED STATES PATENTS

| 2,178,613 | 11/1939 | Seeck | 74—714 X |
| 2,737,829 | 3/1956 | Wilson | 74—694 |
| 2,946,239 | 7/1960 | Hait | 74—710.5 |

FOREIGN PATENTS

| 906,530 | 1/1946 | France. | |

DONLEY J. STOCKING, *Primary Examiner.*

DAVID J. WILLIAMOWSKY, *Examiner.*

J. R. BENEFIEL, *Assistant Examiner.*